United States Patent [19]

McClure

[11] Patent Number: 5,349,282

[45] Date of Patent: Sep. 20, 1994

[54] BATTERY CHARGING AND MONITORING SYSTEM

[75] Inventor: Malcolm S. McClure, Indianapolis, Ind.

[73] Assignee: Span, Inc., Indianapolis, Ind.

[21] Appl. No.: 690,203

[22] Filed: Apr. 23, 1991

Related U.S. Application Data

[63] Continuation-in-part of Ser. No. 625,346, Dec. 11, 1990, Pat. No. 5,198,743.

[51] Int. Cl.⁵ .............................................. H02J 7/04
[52] U.S. Cl. ..................................... 320/32; 320/40; 320/48
[58] Field of Search ....................... 320/31, 32, 37, 38, 320/39, 40, 43, 44, 48, 22, 23, 24; 324/426, 427, 433

[56] References Cited

U.S. PATENT DOCUMENTS

| | | | |
|---|---|---|---|
| 3,786,343 | 1/1974 | Ehlers | 320/48 X |
| 4,086,524 | 4/1978 | Kremer | 320/40 X |
| 4,746,854 | 5/1988 | Baker et al. | 320/40 |
| 4,820,966 | 4/1989 | Fridman | 320/32 |
| 4,918,368 | 4/1990 | Baker et al. | 320/40 |
| 4,958,127 | 9/1990 | Williams et al. | 324/427 X |
| 5,013,992 | 5/1991 | Evenson et al. | 320/31 |
| 5,043,651 | 8/1991 | Tamura | 320/43 |
| 5,047,961 | 9/1991 | Simonsen | 320/48 X |
| 5,049,804 | 9/1991 | Hutchings | 320/23 X |

Primary Examiner—Kristine L. Peckman
Attorney, Agent, or Firm—Van Metre Lund

[57] ABSTRACT

This invention relates to the use of rechargeable batteries for supply of electrical power. Devices are provided which are highly efficient and which provide accurate and reliable control and indications, while using a small number of component parts and being otherwise readily and economically manufacturable. Devices of the invention are compact and such that they can be readily included, if desired, as integral parts of battery packs such as those used for supplying power to lap-computers and other types of portable equipment.

15 Claims, 8 Drawing Sheets

BATTERY CHARGING AND MONITORING SYSTEM

REFERENCE TO RELATED APPLICATION

This application is a continuation-in-part of an application of Malcolm Stuart McClure and Phong Binh Chau entitled "BATTERY CHARGER WITH MICROPROCESSOR CONTROL", Ser. No. 07/625,346, filed Dec. 11, 1990, now U.S. Pat. No. 5,198,743 the disclosure of said application being incorporated by reference.

BACKGROUND OF THE INVENTION

1. Field of the Invention

This invention relates to the use of rechargeable batteries for supply of electrical power. Devices are provided which are highly efficient and which provide accurate and reliable control and indications, while using a small number of component parts and being otherwise readily and economically manufacturable. Devices of the invention are compact and such that they can be readily included, if desired, as integral parts of battery packs such as those used for supplying power to lap-top computers and other types of portable equipment.

2. Background of the Prior Art

As described in the introductory portion of the aforementioned McClure et al. application, the Baker et al. U.S. Pat. Nos. 4,746,854 and 4,918,368 contain reviews of citations of the prior art and discloses battery chargers having a number of advantageous features, including a method and arrangement for accurate detection of a peak charge condition to permit rapid charging of a battery while avoiding dangerous overcharge condition with a high degree of reliability. The aforementioned McClure et al. application are directed to improvements upon and extensions of the inventions of the Baker et al. patents.

SUMMARY OF THE INVENTION

This invention was evolved with the general object of providing additional improvements upon and extensions of the inventions of the Baker et al. patents, particularly with respect to reducing manufacturing costs while improving upon the accuracy and reliability of control.

Important aspects of the invention relate to the recognition of the possibility of incorporating battery charge control devices as integral parts of battery packs and to the recognition of advantages to be obtained therefrom. More specific objects of the invention thus relate to providing devices which are small in size and weight with low power consumption and in providing other features such that they can be incorporated in battery packs for control and monitoring of charge and discharge of batteries.

In accordance with the invention, a microprocessor/microcontroller and related circuitry are incorporated into a battery pack itself. This not only allows peak charge detection circuitry to reside inside the pack, but facilitates an extremely important secondary function, namely that the processor can keep accurate track of the state of charge of that battery as it is charged or discharged. Information regarding the state of charge can then be displayed on an indicator in the pack and/or sent back to the host equipment. There the information may be displayed on some indicator in the host equipment (e.g. a laptop computer screen) or used by the host equipment to, perhaps, initiate charging or prepare for imminent loss of power.

In monitoring the state of charge of a battery, devices of the invention may be referred to herein as "gas gauge" devices for the reason that they perform functions analogous to those of the conventional gas gauges of automobiles in providing information relating to the energy available for continued operation. However, devices of the invention are not limited to use as "gas gauges" and perform other important functions particularly in regard to control of battery charging and protection of batteries from damage.

Additional important features of the invention relate to battery chargers which are highly efficient and reliable and which can be provided with different current-carrying capacities and other capabilities depending upon the requirements of a particular application. Such chargers are usable with a battery pack of the invention, or may be used with other forms of battery packs.

Illustrated embodiments of the battery packs and chargers of the invention incorporate voltage measurement schemes like those described in the aforementioned McClure et al. application. An R-C ramp is initiated by a processor which measures the time between the start of the ramp and the coincidence of the ramp with the voltage being measured. However, in accordance with a specific feature of the invention, the number of required components is reduced by elimination of the transistor used to hold the ramp signal at ground. It was found that the processor could directly accomplish this function. Prior to the start of the ramp, an output pin of the processor holds a capacitor voltage at a logical low level. To commence the ramp, the processor pin is switched to a tri-state mode.

In addition to reducing the number of required components, it is found that the use of the processor to directly control the ramp signal has two other advantages. First, it draws less power because no current is wasted for base drive of a transistor. Second, CMOS transistors in the processor are able to pull the ramp signal closer to ground than is possible with an external bipolar transistor. This is important when the ramp is used to measure very low level signals as is the case with the current monitoring portion of the circuit as described hereinafter.

Illustrated embodiments of the battery pack and chargers of the invention also perform voltage measurements under processor control in a manner similar to the voltage measurements of the aforementioned prior McClure et al. application, but differ therefrom with regard to the manner of initiating the ramp and in a modification of the manner of control of a measurement loop such that all voltage readings take the same amount of time which is found to be highly advantageous for monitoring the condition of charge of batteries, as hereinafter described. The voltage measurements may also incorporate any of the features previously disclosed in the aforementioned prior application, such as, exponential averaging, false peak detection and anticipatory shut-off of charge current, reference being made to said previous application for a full discussion of these features.

Important features of the invention relate to circuitry which accurately measures battery current in both charging and discharging directions and to the operation of the processor to precisely monitor and integrate the measured values of battery current to provide an accurate indication of the condition of charge of a battery. An illustrated embodiment has similarities to the system of the aforementioned McClure et al. application in that current is monitored by placing a very low value current sense resistor in series with a battery pack and monitoring the voltage across it but other forms of current monitoring means may be used, such as Hall-effect devices, for example.

Further features of the invention relate to the use of a comparison with a ramp voltage to measure other parameters, preferably using a single ramp voltage for measurement of a number of parameters. One feature relates to the measurement of temperature, using a thermistor connected to develop a voltage which is a function of temperature and which is compared with the ramp voltage to develop a count proportional to temperature. Another feature relates to the provision for use of an external resistor which may be adjusted or selected for development of a voltage which is proportional thereto and which is compared with the ramp voltage to develop a count proportional to the value of the external resistor. For example, the arrangement may be used to obtain digital data corresponding to the value of an internal fixed resistor of a battery pack which has a value corresponding to the capacity of the battery pack. In this way, control data can be easily, accurately and inexpensively supplied to a processor for use performing its operations according to the requirements of a particular application.

Specific features of the invention relate to the transmission of data corresponding to the state of charge of batteries to equipment operated by the batteries, or to another monitoring point. In particular, the charge-monitoring circuitry is provided which includes a transmitter for transmitting such data which may preferably be transmitted serially, most preferably in a RS-232 format. A processor is used advantageously to act as the transmitter, while performing other functions, in a manner such as to minimize the required circuitry.

Further important features of the invention relate to charger circuitry operative for obtaining accurate and reliable control of charging current while using a minimum number of components and being inexpensive to manufacture. Circuits are provided such that a relay, a power transistor or a MOSFET may be used as a main current switching component, depending upon the current and other requirements of a particular application.

This invention contemplates other objects, features and advantages which will become more fully apparent from the following detailed description taken in conjunction with the accompanying drawings.

DESCRIPTION OF PREFERRED EMBODIMENTS

Figure 1:
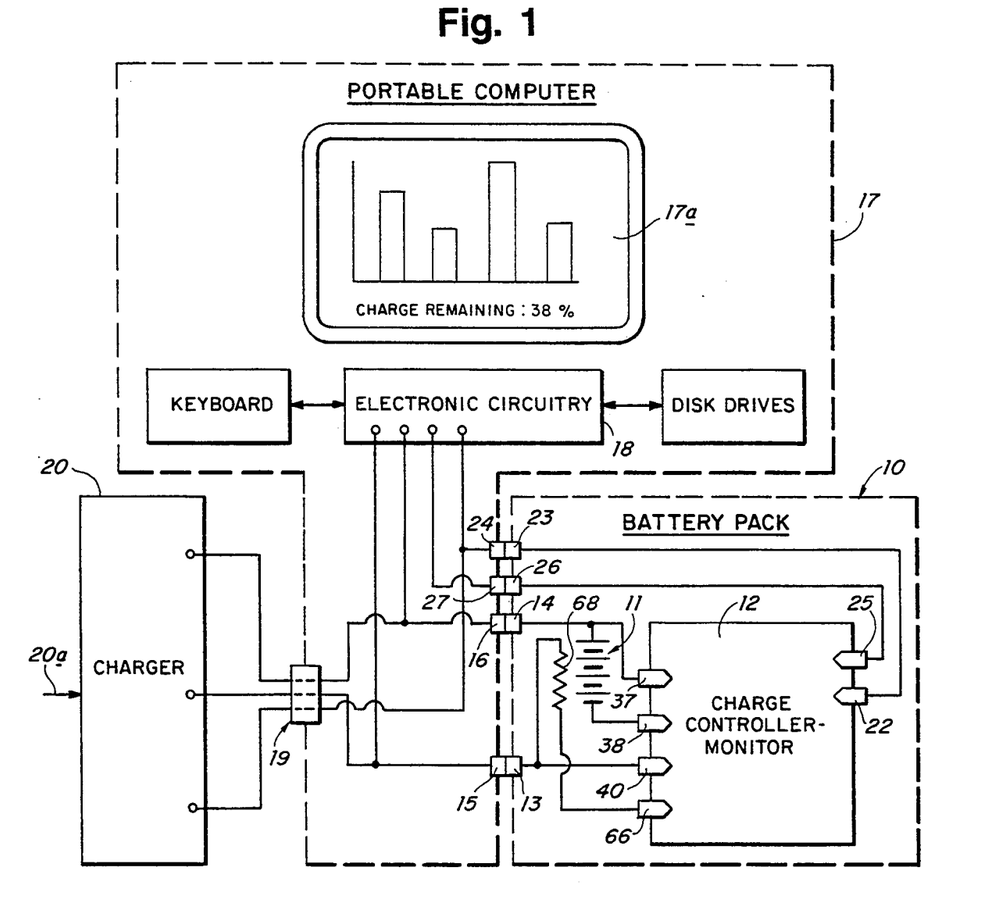
FIG. 1 diagrammatically illustrates a battery pack and a charger constructed in accordance with the invention and shown connected to a portable computer.

Reference numeral 10 generally designates a battery pack which is constructed in accordance with the principles of this invention and which includes batteries 11 therewithin and also, as an integral part thereof, a charge controller-monitor 12. In addition to providing signals for control of charging, the charge controller-monitor 12 operates to monitor the condition of charge of the batteries 11 and is referred to herein as a "gas gauge module".

The battery pack 10 includes terminals 13 and 14 for connection to a load and for connection to a source of charging current. For example, the terminals 13 and 14 may be connected to power input terminals 15 and 16 of a portable computer 17 in which the battery pack 10 is installed, to be connected to electronic circuitry 18 and to be also connectable through a connector 19 to an external charger 20 which may be supplied with electrical power from an AC line, automobile battery or other suitable source, as indicated by arrow 20a. It will be understood that a charger may be connected directly to the battery pack 10 or to an extra battery pack and also that a charger may be included as part of computer or other battery-operated equipment. Other interconnection arrangements are possible. Preferably, the charger 20 includes one of the forms of circuitry of the invention as illustrated in FIGS. 6, 7, 8 and 9.

Figure 1A:
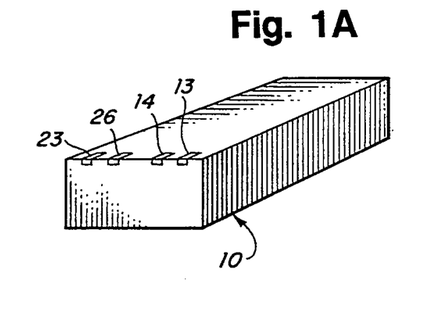
FIG. 1A is a perspective view illustrating a physical form of the battery pack of FIG. 1.
Figure 1B:
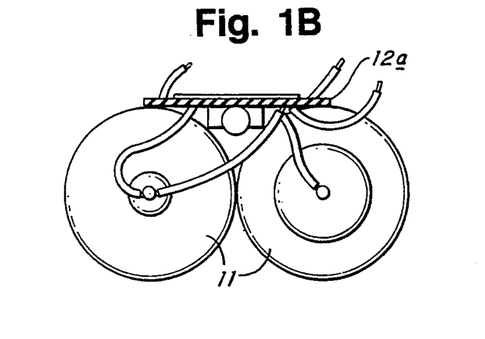
FIG. 1B is a cross-sectional view of a battery and circuit board assembly for the battery pack of FIGS. 1 and 1A.

The batteries 11 may be in the form of a plurality of cells, for example 6 cells in two rows of 3 cells each, with the cells of each row in end-to-end relation and connected in series relation and they may be enclosed in a generally rectangular plastic housing as depicted in FIG. 1A. FIG. 1B, which is on an enlarged scale in comparison to FIG. 1A, is an end view of a cell assembly, illustrating the mounting of a circuit board 12a against the batteries or cells 11. As shown, the circuit board 12a carries circuitry of the charge controller-monitor 12 and with surface mount pads on the outwardly facing surface thereof and with larger components nestled between rows of cells on the opposite side thereof. After assembly of the circuit board and cells as shown in FIG. 1B, the assembly is encased in a plastic housing to form a pack as shown in FIG. 1A with the charge controller-monitor as an integral part thereof.

The illustrated charge controller-monitor 12 includes an LCD display 21 for indicating the condition of charge of the battery and also includes a "charge done"

output terminal 22 which is connected to a terminal 23 of the battery pack 10 to supply a signal which indicates a fully charged condition of the batteries 11. The signal at terminal 23 may be used to indicate a fully charged condition of the batteries 11 as well as to control termination of charging by a charger which may be either separate from, part of or controlled by any computer or other equipment to which the battery pack 10 may be connected. As shown, terminal 23 is connected to a terminal 24 of the computer 17 and terminal 24 connected through the connector 19 to the charger 20 to be usable for direct control thereof to terminate charging. However, charger circuits of the invention as hereinafter described are operative to determine when charging is complete and to be terminated and when such a charger circuit is used, the need for use of the signal from terminal 22 of the charge controller-monitor is obviated.

In addition and in accordance with an important feature of the invention, the module 12 develops a serial output signal of RS-232 form at a terminal 25 which is connected to a terminal 26 of the battery pack 10, shown connected to an input terminal 27 of the computer 18. In an illustrated embodiment of the charge controller-monitor module 12, signals are developed periodically at the RS-232 terminal 26 to send data in the form of three digits of ASCII data ranging from 000 to 100 representing 0% to 100% of charge capacity, but it will be understood that other formats may be used. For instance, the format may include an indication of time remaining at present rate of use. In the illustrated arrangement, the computer 17 may be programmed to process the data and produce corresponding indications. For example, it may show the percentage of charge remaining on the lower portion of a display 17a of the computer 17 as shown in FIG. 1. It should also be understood that the serial output signal at the RS-232 terminal 26 as well as the full charge signal at "charge done" terminal 24 may be provided either in addition to or as alternatives to each other or to the use of the display 21.

Figure 2:
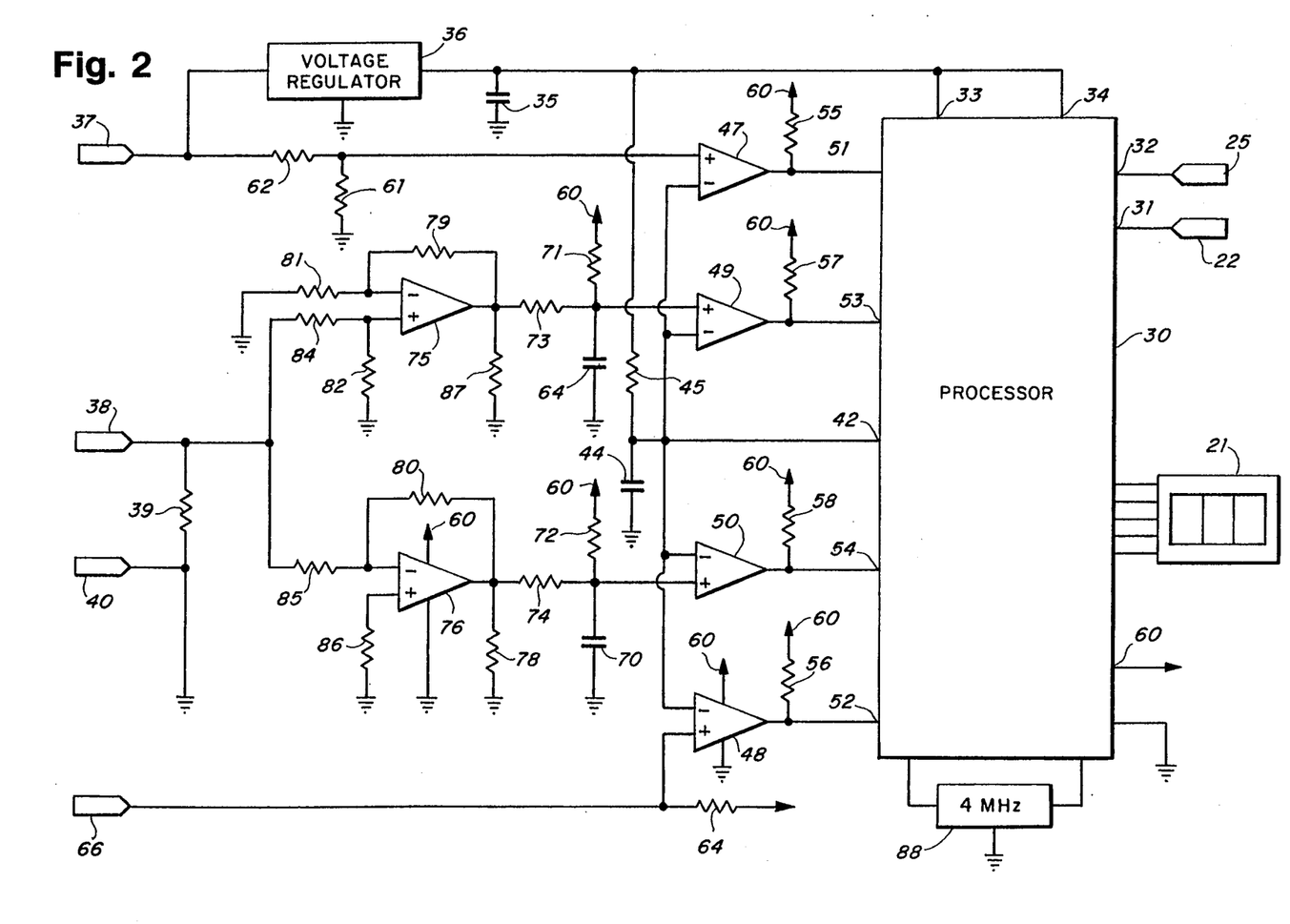
FIG. 2 is a schematic circuit diagram of a charge-controller monitor of the battery pack of FIGS. 1, 1A and 1B.

FIG. 2 is a circuit diagram of the charge controller-monitor 12. It includes a microprocessor 30 having output pins connected to the LCD display 21, as indicated, and having output pins 31 and 32 connected directly to the "charge done" and RS-232 terminals 22 and 25. Voltage supply and master clear pins 33 and 34 of processor 30 are connected through a filter capacitor 35 to ground and to the output of a voltage regulator 36 which has an input terminal connected to a terminal 37 which is connected to the battery pack terminal 14 and also the positive terminal of the batteries 11. A terminal 38 is connected to the negative terminal of the batteries 11 and also through a current sense resistor 39 to a terminal 40 which is connected to the battery pack terminal 13 and to circuit ground.

Through the current sense resistor 39, a positive voltage is developed at terminal 38 in proportion to current applied in charging of the batteries 11 while a negative voltage is developed at terminal 38 in proportion to currents flowing to a load to discharge the batteries. In accordance with the invention, periodic measurements of the voltage at terminal 38 and of the battery voltage at terminal 37 are made, with fixed time intervals therebetween and through integration of such measurements, an accurate determination is made as to the condition of charge of the batteries 11. In addition to voltage and current measurements, a measurement of a voltage proportional to the temperature of the batteries 11 is made and is used to avoid excessive heating to otherwise insure safe operation.

For measurement of voltages, an arrangement is used which is similar to that disclosed in the aforementioned McClure et al. application in which a ramp voltage is generated and compared with a voltage to be measured, the elapsed time being measured between initiation of the ramp voltage and the time at which the voltage being measured equals the ramp voltage. To generate the ramp voltage, a "hold-down" output pin 42 of the processor 30 is connected through a ramp capacitor 44 to ground and when in a low state holds the capacitor 44 in a substantially fully discharged condition.

Periodically, the processor removes the low state of the output pin 42 by going into a tri-state mode to allow charging of the capacitor 44 through a resistor 45 which is connected to the output of the voltage regulator circuit 36. As a result, a ramp voltage is developed at the ungrounded terminal of the capacitor 44 which is connected to the pin 42.

As a result of the use of the processor pin 42 to directly control charging of the ramp capacitor 44, the need for the transistor of the prior circuit is obviated. As aforementioned, in addition to reducing the number of required components, it is found that the use of the processor to directly control the ramp signal has two other advantages. First, less power is drawn because no current is wasted for base drive of a transistor. Second, CMOS transistors in the processor 30 are able to pull the ramp signal closer to ground than is possible with an external bipolar transistor. This is important when the ramp is used to measure very low level signals as is the case with the current monitoring portion of the circuit of the invention.

The ramp voltage so generated across the capacitor 44 is applied to negative input terminals of four comparator circuits 47, 48, 49 and 50 which have outputs connected to input pins 51, 52, 53 and 54 of the processor 30 and through resistors 55, 56, 57 and 58 to a power control output pin 60 of the processor at which a high signal is developed when measurements are to be made.

Comparator circuit 47 is used to measure the battery voltage, the plus input thereof being connected to the junction between two resistors 61 and 62 which operate as a voltage divider and which are connected in series between ground and the terminal 37. Comparator circuit 48 is used to measure battery temperature, the plus input terminal thereof being connected through a resistor 64 to the power control output pin 60 and to a terminal 66 which is connected to ground through a thermistor 68. Thermistor 68 is physically located in proximity to the batteries 11 of the pack 10 as indicated in FIG. 1.

Comparator circuits 49 and 50 are used to measure charge and discharge current values, respectively. In particular the plus inputs of comparator circuits 49 and 50 are connected to ground through filter capacitors 69 and 70 and are connected to the power control output pin 60 through resistors 71 and 72 which supply an offset voltage. In addition, the plus inputs of comparator circuits 49 and 50 are connected through resistors 73 and 74 to the outputs of two stages 75 and 76 of a precision dual operational amplifier. Such amplifier outputs are connected through resistors 77 and 78 to ground and through feedback resistors 79 and 80 to minus inputs of the stages 75 and 76 and each can only swing from ground upward in response to the voltage applied to its input.

The stage 75 operates as a positive gain stage to amplify any positive voltage developed across the current sense resistor 39 and to measure any charging current. As shown, the minus input thereof is connected through a resistor 81 to ground while the plus input thereof is connected through a resistor 82 to ground and through a resistor 84 to the terminal 38.

The stage 76 operates as a negative gain stage to amplify any negative voltage developed across the current sense resistor 39 and to measure any discharging current. As shown, the minus input thereof is connected through a resistor 85 to the terminal 38 while the plus input thereof is connected through a resistor 86 to ground.

In the illustrated circuit, the current sense resistor 39 has a value of 0.1 ohms. To obtain voltages which can be accurately measured, the voltage across the current sense resistor 39 is simultaneously amplified by factors of $+10$ and $-10$ by the two stages 75 and 76 of a precision dual op-amp. The output of the positive-gain stage 75 is used to measure charging current and the output of the negative-gain stage 76 is used to measure discharging current. Both outputs can only swing from ground upward. Thus, when the battery is under charge, it is reflected as a positive output on the positive-gain stage 75 while the output of the negative-gain stage 76 sits at zero. Similarly, as the battery is discharged, the output of the negative-gain stage 76 swings positive while the output of the positive-gain stage 75 sits at zero. At this point, each millivolt of output signal reflects a milliampere of battery current.

The output signals next have a constant offset added to them through the resistors 71 and 72 which is preferably about 50 mV, for example. This is advantageous in insuring that their levels are higher than the starting level of the ramp signal across capacitor used to measure them. Also, at this point, the two signals are capacitively filtered by the capacitors 69 and 70 to integrate out high frequencies. This insures that each reading by the processor is the actual average of the current during that reading period. The offset and filtered signals are now ready for measurement by the processor, further features of the invention being directed to such measurement.

In the illustrated circuit, the processor 30 is supplied with a clock signal which may be a 4 Mhz signal for example and which is developed by a resonator 88 of inexpensive construction. The operation of the processor is depicted in the flow diagrams of FIGS. 3, 4A, 4B and 5.

In accordance with an important feature, the processor accurately determines the magnitude and polarity of the battery current from a single firing of the ramp. This is accomplished in four stages, using procedures similar to those disclosed in the aforementioned McClure et al. application, the operation being depicted in the flow diagram of FIG. 3. First, the ramp is released and the processor is put in a counting loop, watching for coincidence with either current sense signal, and jumps to a secondary counting loop operation which includes two counting loops, one for positive currents and the other for negative currents.

Figure 3:
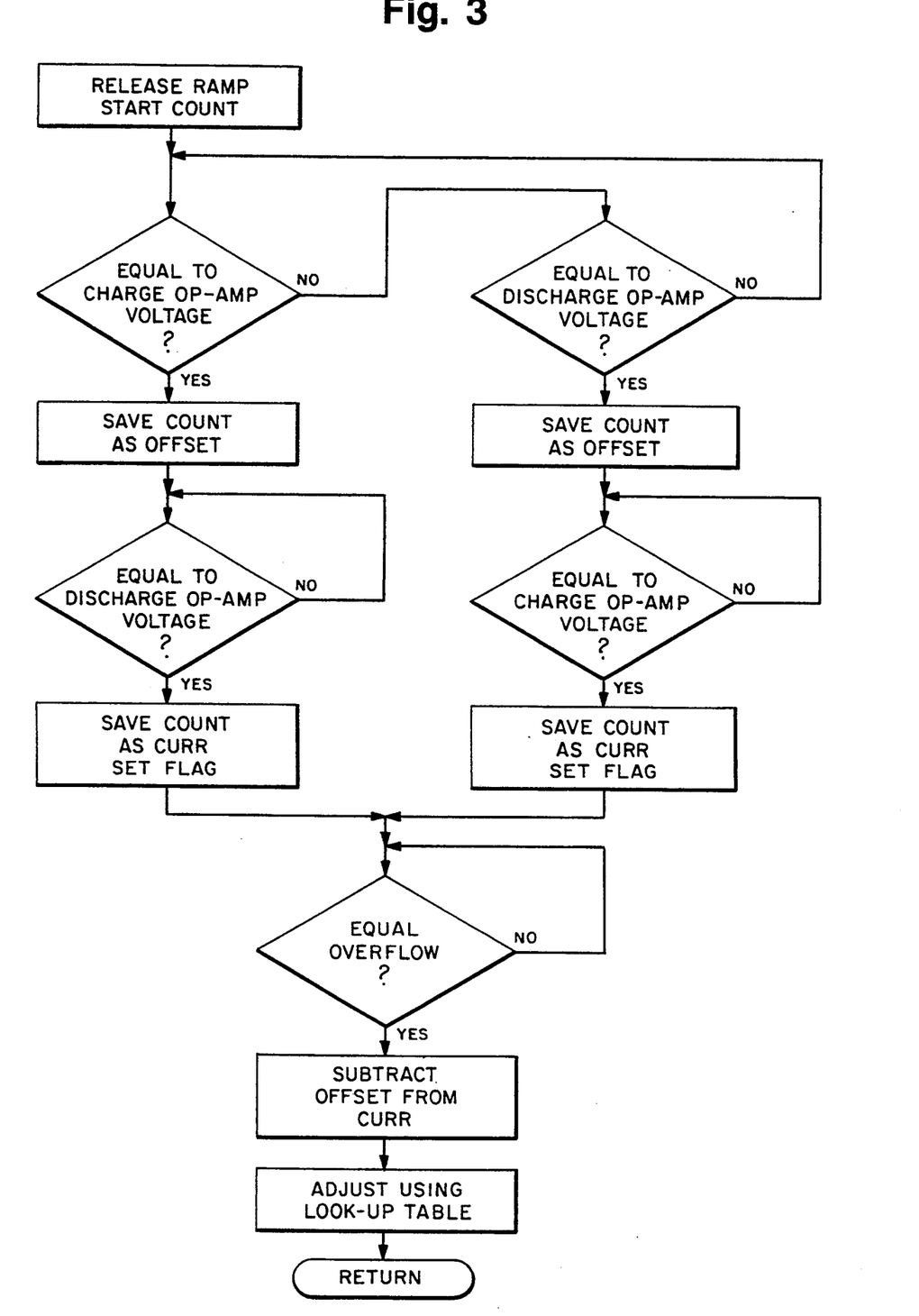
FIG. 3 is a flow diagram illustrating processor operations performed in monitoring flow of both charge and discharge currents.

When the first coincidence is observed, the processor in effect realizes that it is the result of the ramp passing the fixed offset voltage that was added to the inactive op-amp. The processor then saves the count value as a value identified in source code by the term "OFFSET" and jumps to a loop that focuses its attention solely on the other op-amp signal. When coincidence occurs here, the count is saved as a value identified in source code as "CURR", the current reading. Also, a flag is set, indicating which secondary loop was used, and, hence, what the sign of the current was.

Though all the necessary information has now been stored, the processor jumps to a third counting loop that continues the previous count until an overflow occurs. This insures that all current measurements take the same amount of time and, hence, the currents can be measured at exactly equal intervals. This is an essential factor in accurately time-integrating the currents. This constant-time requirement could be achieved with a real-time clock and interrupt scheme, but in the illustrated system, the required results are obtained with an inexpensive processor which does not have such features.

Finally, the current reading is processed to eliminate offsets and non-linearities. To compensate for the offset, the value of OFFSET is subtracted from the value of CURR. Although the value of OFFSET actually pertains to the inactive op-amp signal, the precision resistors used to generate the offset signals ensure that they will be within 1% of each other and any errors will be slight.

As is indicated in the aforementioned McClure et al. application, the voltage measurement scheme, while being capable of extremely high resolutions over a very wide input range, is decidedly non-linear. For sensing peak battery voltage, this is not a problem. It is found, however that it is a problem when attempting to accurately monitoring current. Since the non-linearity follows a very predictable equation based on the R-C time constant of the ramp, it is a relatively straight forward task to compensate the readings.

A number of compensation schemes are possible. In the illustrated system, a piece-wise linear approximation technique is used that breaks the desired current range, which may be 0 to 3.5 Amps, for example, into 16 segments of equal length and approximates them by the equation $I=mX+b$. Here, I is the compensated current reading, X is the actual current reading and m and b are constants found in a look-up table. The upper bits of X are used as the address in the table.

When a reading is taken, the data is plugged into the equation with the appropriate constants to produce the compensated result. Test results show that the compensated I values are within 1 mA or 2% of correct over the entire current range.

Figure 4:
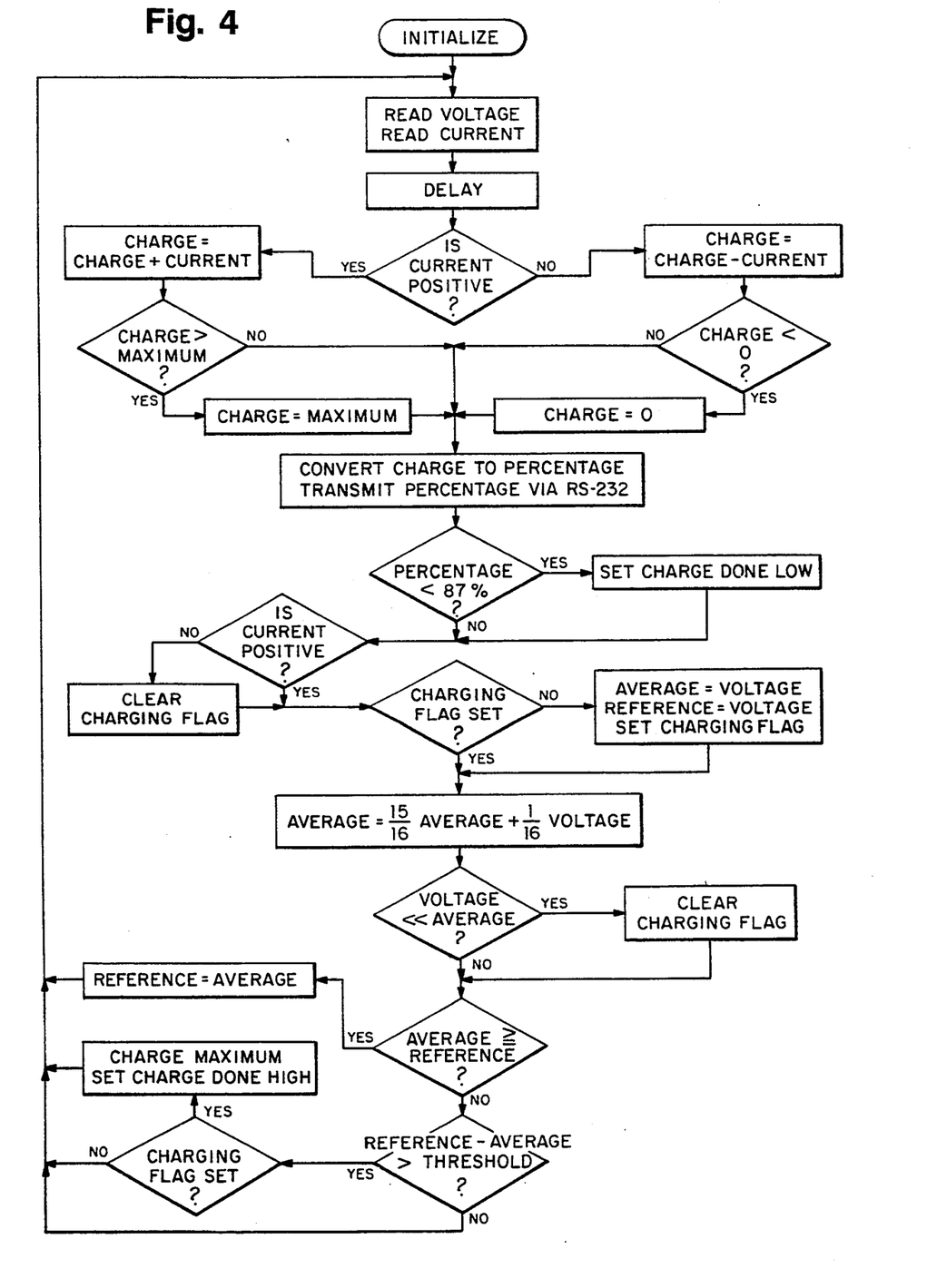
FIGS. 4A and 4B together from a flow diagram illustrating a main routine of processor operations performed by the charge-controller monitor illustrated in FIG. 2.
Figure 5:
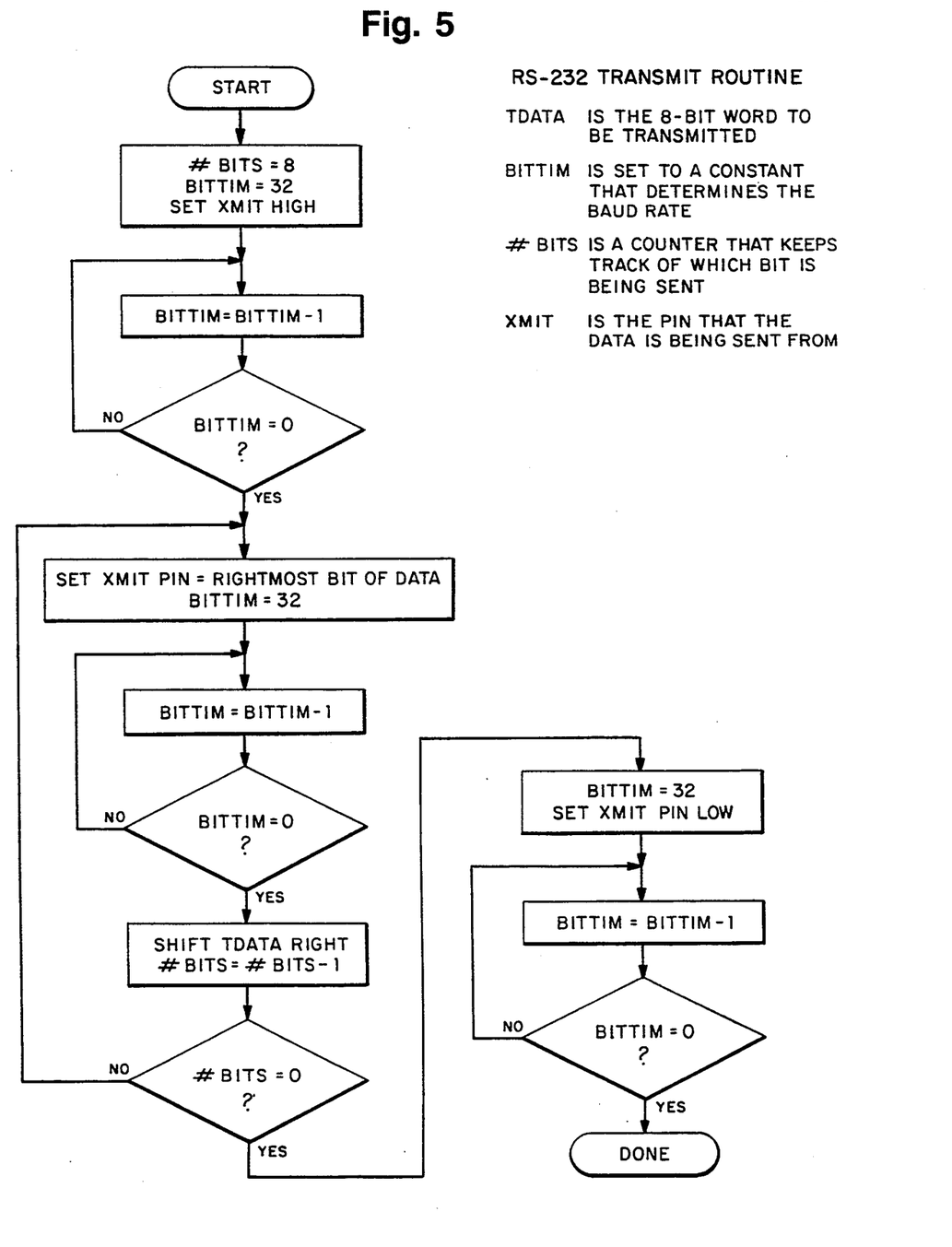
FIG. 5 is a flow diagram illustrating a RS-232 transmit routine of processor operations performed by the charge-controller monitor illustrated in FIG. 2.

The overall operation is depicted in the flow diagram of FIGS. 4A and 4B, while a RS-232 transmit routine is depicted in FIG. 5. Referring to FIG. 4A, when the processor first senses a power-up, it assumes that the host battery was fully discharged and that charging has now commenced. It, therefore, sets its internal STATE-OF-CHARGE register to zero. It also sets its CHARGE DONE pin low, indicating to the outside world that it desires to be charged.

The processor then jumps into its main software loop. On each pass through the loop a battery voltage reading is made and factored into the running exponential average. Based on this data, a decision is made as to whether the pack has reached full charge. If it has, the CHARGE DONE pin is brought high, indicating that fast charge should be terminated.

A current reading is also made on each pass through the main software loop. If the battery is receiving charge current, the current is added into the STATE- OF-CHARGE register. If the battery is being discharged, the current is subtracted from the register. It is this simple addition or subtraction that accomplishes the numerical time-integration of the current and keeps track of the state of charge. Software limits are placed on the STATE-OF-CHARGE register so that it cannot go above a predetermined value (corresponding to full charge) or below zero. Whenever the processor sees the STATE-OF-CHARGE value fall below some arbitrary value (corresponding to 87% in the illustrated unit), the CHARGE DONE line is again set low in order to request fast charging. Whenever the peak detection software senses that full charge has been reached, the STATE-OF-CHARGE register is set to its maximum value. The arrangement is also advantageous in that it can be readily arranged and calibrated to indicate a full discharge condition.

Also, on each pass through the main loop, the STATE-OF-CHARGE data is scaled appropriately and transmitted on the RS-232 pin, using an operation as depicted in FIG. 5, it being noted that no hardware other than the processor 30 is required. The information may be sent in a number of formats. In the illustrated embodiment, it is sent serially as three digits of ASCII data ranging from 000 to 100 representing 0% to 100%, but it could also be sent in a binary format of some type. Further, it is possible to have the processor interrogate the RS-232 pin and only send the information on request from the host. This pin could also be used to communicate other information, in either direction, between the processor and host.

One additional routine of importance occurs in the main software loop, a pause of several hundred milliseconds. Since great efforts have been made to make all possible paths through the main loop to, otherwise, take a constant amount of time, it is solely the length of this pause that calibrates the gas gauge to capacity of the pack. This approach makes it simple to tailor the gas gauge to the various capacity packs available. In production, the unit could be set for a given pack size, for instance by simply jumpering pins on the processor, or by measuring a resistance in the manner as previously mentioned or by other means. The processor would then read this information and set the appropriate pause length.

With regard to construction of the charge controller-monitor 12, it is noted that in the illustrated arrangement, all of the circuitry draws its power from the battery itself. Since the battery may go long periods without being recharged, it is important that the hardware draw as little current as possible. All resistance values were chosen with this in mind.

An LM2931Z regulator or the equivalent is advantageously used to supply the 5 volts for the processor and other electronics. This regulator not only draws very little quiescent current, but features a dropout voltage of only 5.6 V. This enables the gas gauge to function down below the lower usable limit of a six-cell pack.

The comparators, op-amps and various pull-up resistors are powered from the output pin 60 of the processor 30. This gives the processor 30 the capability of turning off the other electronics except as needed. The processor 30, itself, is capable of entering a sleep mode that cuts its current to a few microamps.

The inclusion of a temperature monitoring capability is an optional feature which is highly advantageous in some applications and which is easily accomplished using the thermistor 68 and the comparator 48 for monitoring its operation. Incorporating this feature allows a gas-gauge-equipped battery pack to use its delta-peak cutoff capability with a standard temperature cutoff charger. Also, a temperature cutoff back-up scheme is desirable, especially when a pack is being charged while under a varying load.

An important feature of the controller-monitor 12 is that refinements can be readily added to obtain second order improvements in accuracy and to allow operation with different types of batteries and in different environments. For instance, nickel cadmium and nickel metal hydride batteries exhibit a tendency for self-discharge when not in use. This extra depletion factor does not show up in the gas gauge current measurements, but with the illustrated arrangements, it could be readily accounted for simply by keeping track of time elapsed since last charging occurred.

Rechargeable batteries do not exhibit 100% charging efficiency. That is, more power must be put into charging a pack than can be gotten out on discharge. Also, the charge efficiency varies with the amount of charge already in the pack, pack temperature and a number of other factors. Compensation for these effects could also be incorporated into the software.

The illustrated circuitry has very low power drain but to further reduce power drain, the software could put itself into a "sleep mode" when it sensed that the battery had not seen use for several minutes. In this mode, the processor would totally shut down its electronics for periods of, say, 2.5 seconds and, then, only briefly come to life to see if the situation had changed. If no change had occurred, it would go back to sleep.

Still another advantage of the illustrated arrangement is that it is readily adaptable to inclusion of an EEPROM in the circuit. This would permit the processor to retain certain information even when the host battery was depleted. For instance, the unit could keep track of how long it had been since the battery was last reconditioned. (Reconditioning involves putting the pack through a regimen of full charge/discharge cycles to erase any "memory" effect and return the pack to its full capacity.) The unit could then notify the operator or charging equipment of the need for reconditioning. Further, the gas gauge could observe trends in its capacity over time and automatically adjust its 100% point.

Still another advantage is that the gas gauge circuitry is capable of bringing the advantages of delta-peak charging to some conventional charging equipment. Thermal cutoff chargers generally depend on a thermal switch or thermistor inside the battery pack to control the charge rate applied. The thermal information is brought out on a separate terminal on the pack. With minor changes to the circuit of the controller-monitor 12, it would be able to mimic these control signals produced by conventional means and, thereby, not obsolete the charging units.

Figure 6:
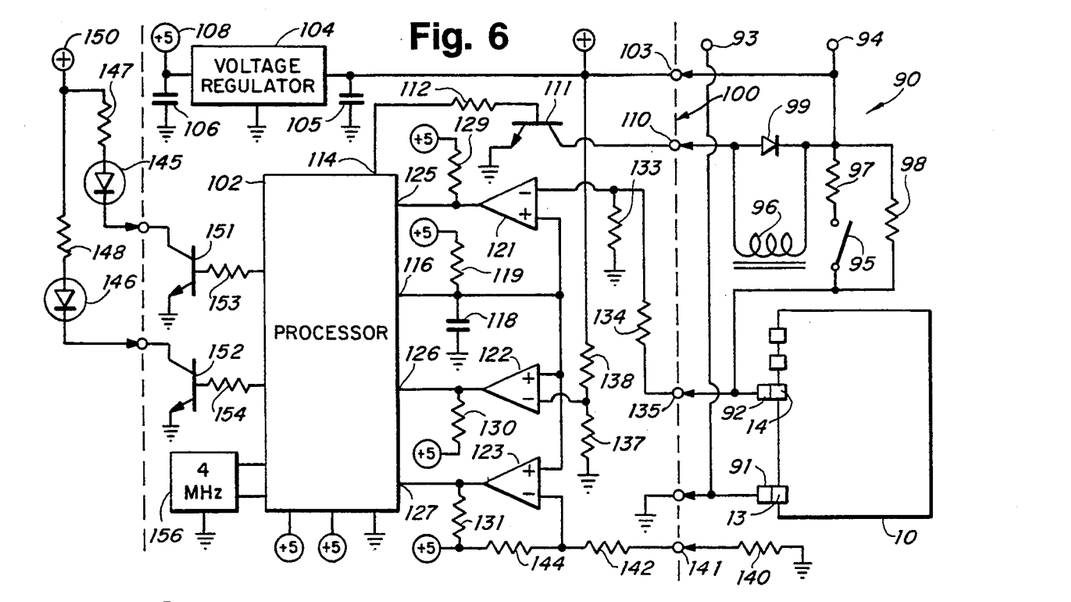
FIG. 6 is a circuit diagram of one form of charger usable as the charger shown in block form in FIG. 1.

FIG. 6 is a circuit diagram of a charger 90 which is usable as the charger 20 in the arrangement of FIG. 1 and which is constructed in accordance with the principles of the invention. The charger 90 of FIG. 6 is arranged to monitor the output voltage of the illustrated battery pack 10 but is not limited to such use and can be used with battery packs of other constructions. It so controls the charging current as to obtain a rapid charge while safely cutting off the charging current when the full charge condition is reached. The charger 20 uses advantageous features of the aforementioned Baker et al. patents and the aforementioned McClure et al. application, but with improvements related to improving operation and reducing size, the number of components and the cost of manufacture.

As shown in FIG. 6, the charger 90 has terminals 91 and 92 for connection to the battery pack 10 as shown, or for connection to battery packs of other forms. Terminals 93 and 94 are provided for connection to a source of DC charging current such as, for example, the output of a rectifier connected to the secondary of a step-down transformer having a primary connected to 120 volt AC outlet. As shown, terminals 91 and 93 are both connected to a circuit ground and a contact 95 of a relay 96 is connected in series with a current limiting resistor 97 between the terminal 92 and the terminal 94. A resistor 98 is connected between terminals 92 and 94 and may be used to supply trickle charge current. A protection diode 99 is connected across the relay 96.

A circuit module 100 is provided which includes microprocessor 102. To supply operating voltage for the microprocessor 102 and other circuits, a terminal 103 is connected to the terminal 94, to the input of a voltage regulator 104 and through a capacitor 105 to ground. The output of regulator 104 is connected through a capacitor 106 to ground and to a terminal 108 labelled "30 5", connected to all other like-labelled terminals in the illustrated circuitry.

To operate the relay 96, it is connected between the terminal 94 and a terminal 110 of the module 100 which is connected to the collector of a transistor 111 having a grounded emitter and having a base connected through a resistor 112 to an output pin 114 of the processor 102. The processor is arranged to supply a high signal at the output pin 114 to energize the relay 96 and initiate a charging operation and to then monitor the battery voltage and discontinue charging when the battery voltage has passed a peak value and then decreased below the peak value by a certain value. This operation, referred to as a "negative delta peak" operation is highly advantageous in insuring a safe discontinuance of charging after a full charge is reached.

For measurement of voltages, an arrangement is used which is similar to that used in the charge controller-monitor 12 as well as that disclosed in the aforementioned McClure et al. application in which a ramp voltage is generated and compared with a voltage to be measured, the elapsed time being measured between initiation of the ramp voltage and the time at which the voltage being measured equals the ramp voltage. To generate the ramp voltage, a "hold-down" output pin 116 of the processor 102 is connected through a ramp capacitor 118 to ground and when in a low state holds the capacitor 118 in a substantially fully discharged condition.

Periodically, the processor 102 goes into a tri-state mode of the output pin 116 to allow charging of the capacitor 118 through a resistor 119 which is connected to the output terminal 108 of the voltage regulator circuit 104. As a result, a ramp voltage is developed at the ungrounded terminal of the capacitor 118 which is connected to the pin 116.

This arrangement has the same advantages as that of the charge controller-monitor 12. As a result of the use of the processor pin 116 to directly control charging of the ramp capacitor 118, the need for the transistor is obviated, less power is drawn and the ramp signal can be pulled by CMOS transistors of the processor 102 to a potential closer to ground potential and lower level signals may be measured.

The ramp voltage so generated across the capacitor 118 is applied to plus input terminals of three comparator circuits 121, 122 and 123 which have outputs connected to input pins 125, 126 and 127 of the processor 102 and through resistors 129, 130 and 131 to the output terminal 108 of the voltage regulator circuit 104.

Comparator circuit 121 is used to measure the battery voltage, the plus input thereof being connected to the junction between two resistors 133 and 134 which operate as a voltage divider and which are connected in series between ground and a terminal 135 connected to the terminal 92.

Comparator circuit 122 is used to measure the unregulated voltage supplied from the charging current source. Its minus input is connected through a resistor 137 to ground and through a resistor 138 to the terminal 103 which is connected to the current input terminal 94.

Comparator circuit 123 is used to measure the value of an external "program timer" resistor 140 which is connected between ground and a terminal 141 connected through a resistor 142 to the minus input of comparator circuit 123, the minus input of comparator circuit 123 being connected through a resistor 144 to the output terminal 108 of the voltage regulator circuit 104. By measuring the count required to achieve equality between the voltage at the minus input of comparator circuit 123 with the ramp voltage at the plus input thereof, the resistance of the program timer resistor 140 is determined, and the processor can operate to adjust its operation in accordance therewith. This is advantageous in that adjustments can be made simply by changing or adjusting the value of the resistor 140, according to the type of battery pack to be charged. For example, an override may be used to limit the maximum charge time according to the type of battery pack to be charged. The arrangement has the same advantages of that of the charge controller-monitor 12 and that of the prior McClure et al. application in that a number of measurements are made with a single firing of a ramp.

To indicate the state of operation of the circuit, indicating diodes 145 and 146 are connected in series with resistors 147 and 148 between a terminal 150, which may the connected to the terminal 94, and the collectors of transistors 151 and 152 which have grounded emitters and which have bases connected through resistors 153 and 154 to output pins of the processor 102.

The processor 102 is supplied with a clock signal which may be a 4 Mhz signal for example and which is developed by a resonator 156 of inexpensive construction. The processor 102 is programmed to operate in a manner similar to that of the processor in the prior McClure et al. application and may preferably include features thereof such as those which obviate adverse effects of noise, false voltage peaks and variations in contact resistance.

Figure 7:
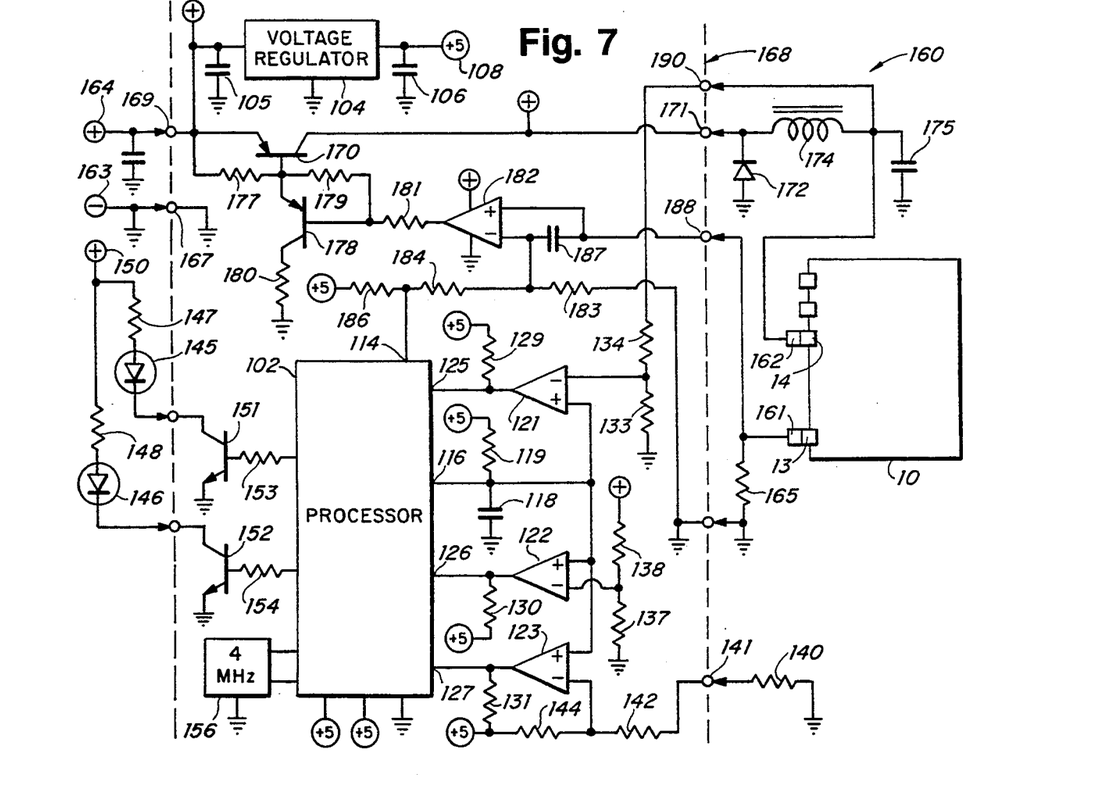
FIG. 7 is a circuit diagram of a second form of charger usable as the charger shown in block form in FIG. 1.

FIG. 7 illustrates another charger 160 of the invention which is similar to the charger 90 of FIG. 6 but which incorporates solid state components to control flow of charging current, achieving a higher level of accuracy and other advantages.

In a manner similar to the charger of FIG. 6, the charger 160 has terminals 161 and 162 for connection to the battery pack 10 as shown, or for connection to battery packs of other forms. Terminals 163 and 164 are provided for connection to a source of DC charging current such as, for example, the output of a rectifier connected to the secondary of a step-down transformer having a primary connected to 120 volt AC outlet.

As shown, terminal 161 is connected through a current sensing resistor 165 to ground while terminal 163 is connected directly to ground and to a ground terminal 167 of a module 168 which includes the processor 102 and other components of the module 100 of the charger 90 of FIG. 6, identified by the same reference numerals.

Terminal 164 is connected to a terminal 169 which is connected to the emitter of a transistor 170 within the module 168, the collector of transistor 170 being connected to a terminal 171 which is connected through a external diode 172 to ground and through an external inductor 174 to the terminal 162, terminal 162 being connected through a capacitor 175 to ground.

The transistor 170 conducts periodically, the time intervals of conduction thereof being controllable to control the average value of charging current. When conductive, current flows in a charging direction to the battery pack through the inductor 174, storing energy in the inductor. When non-conductive, energy stored in the inductor results in current flow through the diode 172 and in the same charging direction to the battery pack.

The time intervals of conduction of the transistor 170 are controlled to accurately control the charging current until a full charge condition is reached, at which time the charging operation is stopped. As shown, the base of the transistor 170 is connected through a resistor 177 to the terminal 169, directly to the emitter of a drive transistor 178 and through a resistor 179 to the base of the drive transistor 178 the collector of which is connected through a resistor 180 to ground. The base of drive transistor 178 is connected through a resistor 181 to the output of a comparator circuit 182 which has a minus input connected through a resistor 183 to ground and through a resistor 184 to the output pin 114 of processor 102 which is connected through a resistor 186 to output terminal 108 of the voltage regulator 104.

The plus input of comparator circuit is connected through a capacitor 187 to its minus input and also to a terminal 188 which is connected to the battery pack terminal 161 and through the current sensing resistor 165 to ground.

In operation, conduction of the drive transistor 178 and thereby conduction of the transistor 170 occurs only when the voltage at the plus input of comparator 182 is less than a reference voltage at the minus input thereof. Prior to starting a charging operation, the output pin 114 is at or near ground potential, developing a near zero reference voltage at the minus input of the comparator 182 to prevent conduction. To obtain a charging operation, the output pin 114 of the processor 102 is shifted to or toward a high state and a higher reference voltage is applied at the minus input of comparator 182. Conduction of transistor 170 is then initiated through control by the comparator 182 of the drive transistor 178.

The voltage at the terminal 188 then increases in proportion to charging current flowing through the current sense resistor 165 and the voltage across capacitor 187 is changed in a direction such that the plus input of comparator 187 becomes positive relative to the reference voltage at its minus input, stopping conduction of the transistors 178 and 170. Energy then stored in the inductor 174 results in continued flow of charging current but at reduced magnitude and the charge of the capacitor 187 is changed in the opposite direction until the potential of the minus input exceeds that of the plus input. The circuit thus operates with an oscillating action, at a frequency determined in part by the value of the capacitor 187, and maintains the average current at a level determined by the average value of the reference voltage at the minus input of comparator 182. The frequency may be on the order of 40 KHz for example, but is not critical.

The reference voltage at the minus input is controllable by the processor 102 to obtain three levels of operation, the first being with no charging current, the second with a trickle charge current and the third with a high charge rate. The first level is with the pin 114 held at a low state to prevent conduction. The second level is with the pin 114 in a "floating" condition, the pin 144 being a tri-state output pin, to allow the level of the minus input to be determined by the ratio of the value of the resistor 183 to the sum of the values of resistors 183, 184 and 186 and to obtain the trickle charge operation. The third level is with the pin 114 held at a high state to allow the level of the minus input of comparator 182 to be determined by the ratio of the value of the resistor 183 to the sum of the values of the resistors 183 and 184, so as to obtain a high charge rate.

By way of example, the resistors 183, 184 and 186 may have values of 220 ohms, 10,000 ohms and 180,000 ohms, respectively.

Except with regard to the manner of control of pin 114 to obtain selective trickle and full charge operations, the processor 102 as used in the charger 160 operates in the same manner as in the charger 90. The minus input of the comparator 121 is connected through the resistor 134 to a terminal 190 which is connected to the terminal 162 to monitor the battery voltage. When the full charge condition is reached, the charging may be discontinued in the same manner as in the charger 90.

Figure 8:
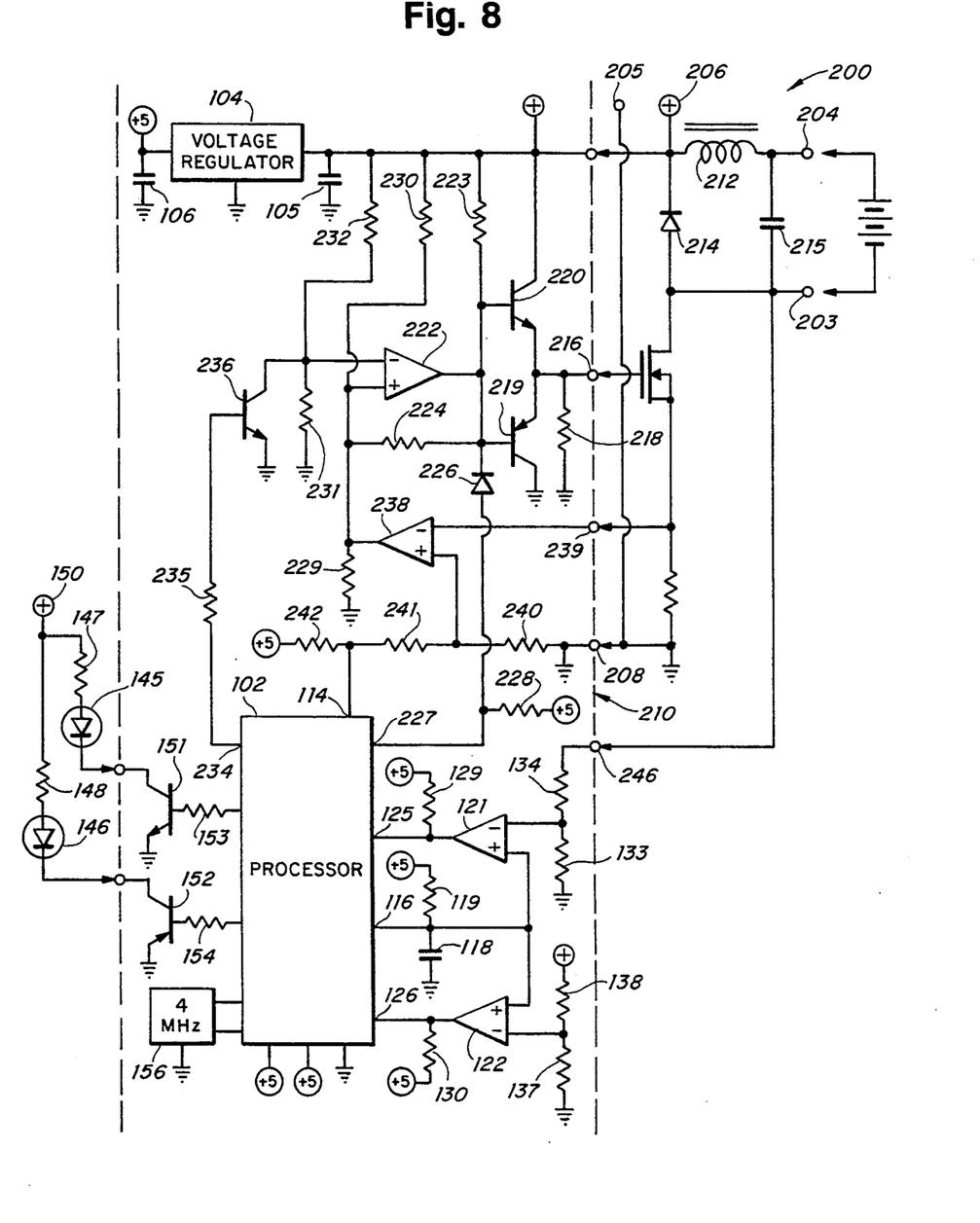
FIG. 8 is a circuit diagram of a third form of charger usable as the charger shown in block form in FIG. 1.

FIG. 8 illustrates another charger 200 of the invention which is similar to the chargers 90 and 160 of FIGS. 6 and 7. The charger 200 differs from the charger 160 in including a MOSFET transistor 202 to control charging current and to provide higher current handling capacity and other advantages.

In a manner similar to the chargers of FIGS. 6 and 7, the charger 200 has terminals 203 and 204 for connection to the battery pack 10 as shown, or for connection to battery packs of other forms. Terminals 205 and 206 are provided for connection to a source of DC charging current such as, for example, the output of a rectifier connected to the secondary of a step-down transformer having a primary connected to 120 volt AC outlet.

As shown, terminal 203 is connected through the MOSFET 202 and through a current sensing resistor 207 to ground while terminal 205 is connected directly to ground and to a ground terminal 208 of a module 210 which includes the processor 102 and other components of the module 100 of the charger 90 of FIG. 6, identified by the same reference numerals. In the circuit of FIG. 8, the manner in which the voltages measured by the comparators 121 and 122 are used is different, as a result of the use of the MOSFET 202 and associated circuitry, as hereinafter discussed. Also, the comparator 123 and the program timer resistor 140 and other associated components are not provided, but it will be understood that they are optional and may be provided if desired.

The current input terminal 206 is connected through an inductor 212 to the output terminal 204 and through a diode 214 to the terminal 203, a capacitor 215 being connected between output terminals 203 and 204. In operation, when the MOSFET 202 is conductive, current flows from the terminal 206 through the inductor 212 and through the battery pack, thence through the MOSFET 202 and the current sense resistor 207 to ground and to the terminal 205. When the MOSFET 202 is non-conductive, energy stored in the inductor 212 results in current flow in the same direction through the battery pack and back through the diode 214.

To control conduction of the MOSFET 202, its gate electrode is connected to a terminal 216 of the module 210 which is connected through a resistor 218 to ground and which is connected to emitters of two driver transistors 219 and 220 coupled in series "totem pole" fashion, the collectors thereof being respectively connected to ground and to a terminal 221 which is connected to the current supply terminal 206. The bases of transistors 219 and 220 are connected together and to the output of a comparator 222, and are also connected through a resistor 223 to the terminal 221 and through a feedback resistor 224 to the plus input of comparator 222. In addition, a monitoring connection through a diode 226 to an input pin 227 of the processor 102 which is connected through a resistor 228 to the regulated supply terminal 108.

The comparator 222 is connected to operate as a flip-flop which may set in one condition to initiate conduction of the MOSFET 202 and which may be reset to the opposite condition to discontinue conduction through the MOSFET 202. The plus input thereof is connected through resistors 229 and 230 to ground and the terminal 221 and the minus input is similarly connected through resistors 231 and 232 to ground and the terminal 221. All four resistors 229-232 may have the same value, for example 10 K ohms to provide a balanced circuit which can be switched into either of two states, each being a stable state as the result of the positive feedback provided by the feedback resistor 224.

To initiate conduction of the MOSFET 202, the processor 102 supplies a signal from an output pin 234 and through a resistor 235 to the base of a transistor 236 having a grounded emitter and having a collector connected to the minus input of comparator 222.

Conduction of the MOSFET 202 is stopped when the voltage across the current sensing resistor 207 reaches a certain level. In particular, the minus input of comparator 222 is connected to the output of a comparator 238 having a minus input connected to a terminal 239 which is connected to the ungrounded end of the current sensing resistor 207. When the charging current exceeds a certain value as determined by a reference voltage supplied to the plus input of comparator 238, the comparator 238 operates to switch the comparator 222 to an opposite state and discontinue conduction of the MOSFET 202.

The plus input of comparator 238 is connected through a resistor 240 to ground and through a resistor 241 to the output pin 114 of the processor 102 which is connected through a resistor 242 to the regulated supply voltage terminal 108. Resistors 240, 241 and 242 have functions similar to those of the resistors 183, 184 and 186 of the circuit of FIG. 7.

In particular, the reference voltage at the plus input of comparator 238 is controllable to obtain three levels of operation, the first being with no charging current, the second with a trickle charge current and the third with a high charge rate. The first level is with the pin 114 held at a low state to prevent conduction. The second level is with the pin 114 in a "floating" condition, the pin 114 being a tri-state output pin, to allow the level of the plus input of comparator 238 to be determined by the ratio of the value of the resistor 240 to the sum of the values of resistors 240, 241 and 242 and to obtain the trickle charge operation. The third level is with the pin 114 held at a high state to allow the level of the minus input of comparator 238 to be determined by the ratio of the value of the resistor 240 to the sum of the values of the resistors 240 and 241, so as to obtain a high charge rate.

By way of example, the resistors 240, 241 and 242 may have values of 1.1 K ohms, 10 K ohms and 100 K ohms, respectively.

An advantageous monitoring operation is obtained through the provision of the diode 226 and associated resistor 228 connected to the input pin 227. After applying a signal to the transistor 235 to initiate flow of charging current, the voltage at the pin 227 should rise immediately and then fall back to a low level when conduction of current is terminated through the operation of the comparator 238, responding to current flow through the current sense resistor 207. If it fails to rise, it indicates a malfunction of the circuit. If, as is more likely, it rises but does not fall back to a high level within a certain time interval, it indicates that there is no battery pack or a faulty connection to a battery pack, and the processor 102 responds by indicating no battery is present.

A special feature of the connection and operation of the processor 102 and comparators 121 and 122 in the circuit of FIG. 8 is related to the connection of the MOSFET 202 in the circuit as shown. The connection shown is advantageous in regard to the location of the ground connection, in simplifying the drive of the MOSFET 202 and allowing the use of a less costly N-channel device. However, the battery pack is placed in a floating relation with respect to ground, especially when critical measurements are being made, during periods when the supply charging current is temporarily cut off to avoid adverse effects of contact resistance, the operation in this respect being the same as disclosed in the previously identified prior McClure et al. application. To accurately measure the battery voltage, the minus input of comparator 121 is connected through the resistor 134 to a terminal 246 which is connected to the output terminal 203 while the minus input of comparator 122 is connected through the resistor 138 to the terminal 221 which is connected through the inductor 212 to the output terminal 204 to be at substantially the same potential as the terminal 204. The processor 102, acting through the comparators 121 and 122, measures the voltages at the two output terminals 203 and 204 and by determining the difference therebetween, accurately measures the battery voltage during periods when no charging current is flowing. The adverse effects of contact resistance are thus avoided while obtaining, at the same time, the advantages of the illustrated connection of the MOSFET 202 and associated drive circuitry.

Figure 9:
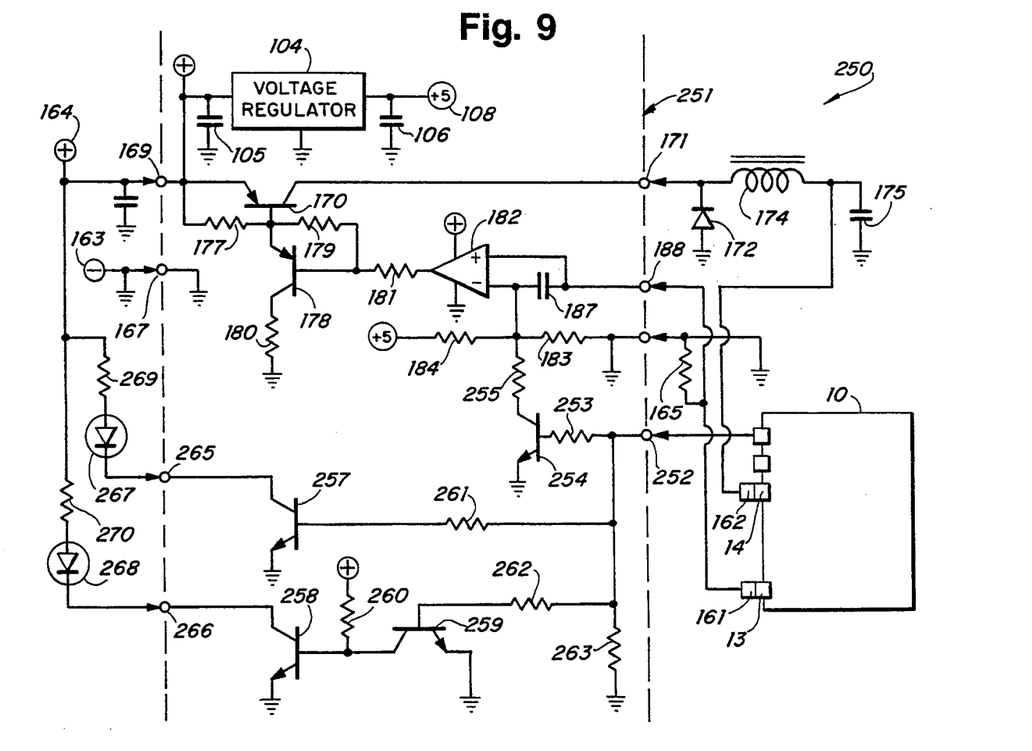
FIG. 9 is a circuit diagram illustrating another form of charger usable with the battery pack of the invention.

FIG. 9 shows a charger 250 which is constructed in accordance with the invention and which is usable to charge the battery pack 10 of the invention. It has similarities to the charger 160 of FIG. 7 but does not use the processor 102 and associated circuitry thereof to terminate a fast charging operation. Instead, it terminates a fast charging operation in response to the "charge done" signal developed at terminal 23 of the battery pack 10 by the processor 30 of the charge controller-monitor 12 of the battery pack 10.

As shown, the charger 250 includes a module 251 which uses the transistors 170 and 178 and associated resistors 177, 179, 180 and 181 and the comparator 182 and associated resistors 183 and 184 and capacitor 187 of the module 168 of the charger 160 of FIG. 7, and the charger 250 also uses the external diode, inductor and capacitor components 172, 174 and 175 of the FIG. 7 circuit. For high current capacity, a MOSFET and associated circuitry as shown in FIG. 8 may be used, if desired.

The circuit of the charger 250 controls charging current in accordance with a reference voltage at the minus input of comparator 182 in the same manner as the circuit of FIG. 7. However, rather than selectively obtaining trickle and fast charge modes under control of the processor 102, as in the FIG. 7 circuit, such modes are selectively obtained in the charger 250 of FIG. 9 under control of the "done charging" signal developed at terminal 23 of the battery pack 10 which is connected to a terminal 252 of the charger module 250. Terminal 252 is connected through a resistor 253 to the base of a transistor 254 having a grounded emitter and having a collector connected through a resistor 255 to the minus input of comparator 182. Resistor 184 is connected directly to the regulated voltage supply terminal 108.

A fast charging operation is obtained in the absence of a high "done charging" signal applied at terminal 252. The transistor 254 is then non-conductive and the reference voltage at the minus input of comparator 182 is then proportional to the ratio of the value of resistor 183 to the sum of the values of resistors 183 and 184. When a high "done charging" signal is applied at terminal 252, the transistor 254 conducts and the resistance between the minus input of comparator 182 and ground is reduced to a lower value, approximately equal to the resistance of the parallel combination of resistors 183 and 255. A low trickle charging rate is then obtained.

The charger module 250 also includes transistors 257, 258, 259 and resistors 260, 261, 262 and 263 with connections to the terminal 252 and to terminals 265 and 266 for selectively energizing indicating diodes 267 and 268 connected in series with resistors 269 and 270 between terminal 265 and 266 and the current supply terminal 164.

Figure 10:
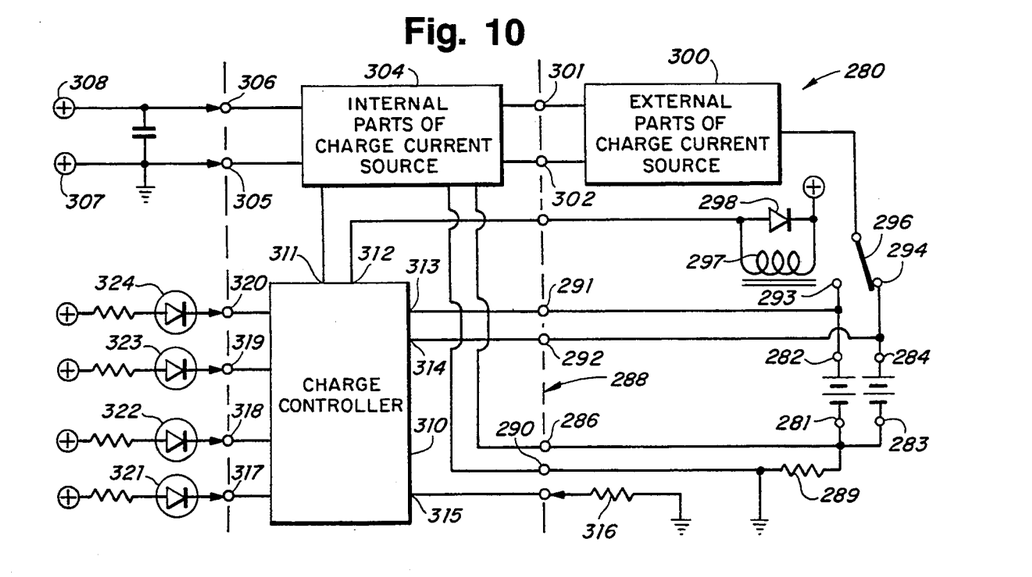
FIG. 10 is a schematic block diagram illustrating a dual pocket charger of the invention.

FIG. 10 is a schematic block diagram of a "dual pocket" charger 280 usable to charge two battery packs indicated by reference characters A and B placed in compartments or pockets of a unit which includes circuitry as shown with terminals 281 and 282 for connection to the A pack and terminals 283 and 284 for connection to the B pack. Terminals 281 and 283 are connected together and to a terminal 286 of a module 288 and are also connected through a current sensing resistor 289 to ground and to a ground terminal 290 of the module 288. Terminals 282 and 284 are connected to terminals 291 and 292 of the module 288 and to fixed relay contacts 293 and 294 selectively engageable by a movable relay contact 296 operated by energization of a relay coil 297 having a diode 298 connected in parallel therewith.

The movable relay contact 296 is connected to parts of a charge current source, indicated by block 300, which are external to the module 288 and which are connected through terminals 301 and 302 to parts of the charge current source, indicated by block 304, which are internal to the module 288 and which are connected to terminals 305 and 306 connected to terminals 307 and 308 of a DC power source. By way of example, the external parts 300 may include the components 172, 174 and 175 of the circuit of FIG. 7 and the internal parts 304 may include the transistors 170 and 178, comparator 182 and associated components of the circuit of FIG. 7. For higher power operation, corresponding components of the FIG. 8 circuit may be used.

A charge controller 310 is provided within the module 288 which may include a processor 102 such as shown in FIGS. 7 and 8 and which may preferably have the same construction and operation as those of the FIG. 7 and 8 circuits and which includes an output terminal 311, corresponding to pin 114 of processor 102, for control of fast and trickle charge operations. It also includes an output terminal 312 connected to a terminal which is connected to the relay 297 for control of which pack is being charged, input terminals 313 and 314 connected to terminals 291 and 292 for monitoring of both packs, an input terminal 315 connected to a program timer resistor 316, and output terminals connected to terminals 317, 318, 319 and 320 which are connected to a voltage supply source through "B TRICKLE", "B FAST", "A TRICKLE" and "A FAST" indicating lights 321, 322, 323 and 324, the lights 321 and 323 being green lights and the lights 322 and 324 being red lights.

In operation, if two packs are placed in pockets, a fast charging operation is initiated with respect of one of the packs, for example the B pack is charged with the relay 297 deenergized, the "B FAST" light 322 is energized and the "B TRICKLE" light 321 is deenergized. Both lights 323 and 324 may also be energized, such red and green lights combining to produce a yellow light which indicates the presence of the A pack. The charging of the B pack is monitored through the input terminal 314. When the fast charge of the B pack is complete, the relay 297 is energized from the output terminal 312 of controller 310, and a fast charge of the A pack is initiated, light 324 is energized to indicate the fast charging of the A pack and light 321 is energized to indicate that the B pack has been charged and that it may be removed if desired. After both packs are charged, trickle charge operations are initiated, the relay being switched to alternately conduct a trickle charge current through the packs, with only the trickle lights 321 and 323 being energized.

It will be understood that modifications and variations may be effected without departing from the spirit and scope of the novel concepts of this invention.

What is claimed is:

1. A rechargeable battery pack comprising: housing means, battery means disposed within said housing means and providing a pair of battery terminals, terminal means on said housing means for connecting said pair of battery terminals to a load and to a charging current source, monitoring means within said housing means connected to said pair of battery terminals and operative to monitor operation of said battery means to determine the state of charge of said battery means, data output terminal means on said housing means, and transmitting means associated with said monitoring means for transmitting through said data output terminal means digital data indicating the state of charge of said battery means, further including charge done output terminal means on said housing means, and transmitting means associated with said monitoring means for transmitting through said charge done output terminal means a signal indicating a full state of charge of said battery means.

2. Apparatus as defined in claim 1, wherein said data transmitting means operates to transmit a serial output signal.

3. Apparatus as defined in claim 2, wherein said serial output signal is transmitted in a RS-232 format.

4. Apparatus as defined in claim 2, wherein said microprocessor means operates to develop said serial output signal at an output pin thereof.

5. Apparatus including a battery charge condition monitor which comprises: battery voltage sensing means for developing a voltage proportional to voltage of a battery, ramp voltage generator means for development of a ramp voltage, voltage comparator means for comparing said ramp voltage developed by said ramp voltage generator means and said voltage developed by said battery voltage sensing means to develop an output signal, and microprocessor means operative for controlling operation of said ramp voltage generator means and for measuring an elapsed time from development of said ramp voltage by said ramp voltage generator means and development of said output signal from said voltage comparator means, said ramp voltage generator means including a ramp capacitor, means coupling said ramp capacitor to a source of charging current, said microprocessor means having an output pin directly coupled to said ramp capacitor and operative between one state in which said ramp capacitor is held in a discharged condition and a second state in which charging of said capacitor from said source of charging current is allowed and in which said ramp voltage is thereby developed across said ramp capacitor.

6. Apparatus as defined in claim 5, further including second voltage sensing means, and a second voltage comparator means for comparing said ramp voltage developed by said ramp generator means and a voltage developed by said second voltage sensing means to develop a second output signal, said microprocessor means being operative for measuring an elapsed time starting from development of said ramp voltage applied to said second voltage comparator means and ending with development of said output signal from said second voltage comparator means.

7. Apparatus as defined in claim 5, further including current supply means for supplying said charging current to said battery, battery current sensing means for sensing said charging current supplied to said battery, and charging current control means coupled to said battery current sensing means and to said current supply means for maintaining said charging current at a controlled value.

8. Apparatus as defined in claim 7, further including means associated with said charging current control means for selectively setting a low controlled value of said charging current for a trickle charge operation and a high controlled value of said charging current for a fast charge operation.

9. Apparatus as defined in claim 8, further including means controlled by said microprocessor means for selectively setting said high controlled value of said charging current for said fast charge operation prior to attainment of a full charge condition and to then set said low controlled value of said charging current to thereafter obtain said trickle charge operation.

10. Apparatus including a battery charge condition monitor which comprises: voltage sensing means, ramp voltage generator means for development of a ramp voltage, voltage comparator means for comparing said ramp voltage developed by said ramp voltage generator means and a voltage developed by said battery voltage sensing means to develop an output signal, and microprocessor means for controlling operation of said ramp voltage generator means and for measuring an elapsed time starting from development of said ramp voltage by said ramp voltage generator means and ending with development of said output signal from said voltage comparator means, said ramp voltage generator means including a ramp capacitor, means coupling said ramp capacitor to a source of charging current, further including current supply means for supply of said charging current to said battery, battery current sensing means for sensing said charging current supplied to said battery, and charging current control means coupled to said battery current sensing means and to said current supply means and operable for maintaining said charging current at a controlled value.

11. Apparatus as defined in claim 10, wherein said voltage sensing means operates to sense battery voltage, and wherein said microprocessor means periodically operates said ramp voltage generator means for measurement of said battery voltage and determination of the attainment of a full battery charge condition.

12. Battery charger apparatus comprising: current supply means for supplying charging current to a battery, said current supply means including power transistor means for conducting said charging current, means including microprocessor means for monitoring battery voltage, battery current sensing means operable independently of said microprocessor means for developing a battery current signal proportional to said charging current supplied to said battery, charging current control means coupled to said power transistor means and to said battery current sensing means and operable in response to a control signal applied thereto and in response to said battery current signal for maintaining said charging current at a value proportional to said control signal applied thereto, said microprocessor means being operable to develop a charge done signal upon charging of said battery to a substantially full charge condition, and said microprocessor means being operable to apply a first control signal to said charging current control means to obtain a high charging current for a fast charge operation prior to development of said charge done signal and to then apply a second control signal to said charging current control means to obtain a low charging current for a trickle charge operation, an inductor coupled in series with said power transistor means to store energy during conduction of said charging current by said power transistor means, and diode means connected to operate during periods of non-conduction of said power transistor means to apply said stored energy in continuing conduction of said charging current to said battery means.

13. Battery charger apparatus, comprising: first and second output terminals for connection to terminals of a battery to be charged, first and second power input terminals for connection to a source of charging current with said first power input terminal forming a circuit ground connection, means for connecting said second output terminal to said second power input terminal, MOSFET transistor means having first and second output electrodes and having a gate electrode for control of current flow between said first and second output electrodes, means coupling said first output electrode to said first output terminal, a battery current sensing resistor coupled between said second output electrode and said circuit ground connection and operative for developing a control voltage proportional to battery current, and control circuit means having an input coupled to said battery current sensing resistor and having an output coupled to said gate electrode of said MOSFET transistor means to control conduction of said MOSFET transistor means and to thereby control battery charging current as a function of said control voltage developed by said battery current sensing resistor.

14. Apparatus as defined in claim 13, said MOSFET transistor means including an N-channel MOSFET transistor.

15. Battery charger apparatus, comprising: first and second output terminals for connection to terminals of a battery to be charged, first and second power input terminals for connection to a source of charging current with said first power input terminal forming a circuit ground connection, means for connecting said second output terminal to said second power input terminal, transistor means having first and second output electrodes and having a control electrode for control of current flow between said first and second output electrodes, means coupling said first output electrode to said first output terminal, a battery current sensing resistor coupled between said second output electrode and said circuit ground connection and operative for developing a control voltage proportional to battery current, and control circuit means having an input coupled to said battery current sensing resistor and having an output coupled to said control electrode of said transistor means to control conduction of said transistor means and to thereby control battery charging current as a function of said control voltage developed by said battery current sensing resistor, said apparatus further including monitoring means coupled to said ground connection and to said first and second output terminals and operative for developing a voltage proportional to battery voltage from the difference between voltages at said first and second output terminals with respect to ground.

\* \* \* \* \*